(12) United States Patent
Daems (10) Patent No.: US 9,419,707 B2
(45) Date of Patent: Aug. 16, 2016

(54) UNIDIRECTIONAL ABSOLUTE OPTICAL ATTENUATION MEASUREMENT WITH OTDR

(75) Inventor: Daniel Daems, 'S Gravenwezel (BE)

(73) Assignee: CommScope Connectivity Belgium BVBA (BE)

( * ) Notice: Subject to any disclaimer, the term of this patent is extended or adjusted under 35 U.S.C. 154(b) by 613 days.

(21) Appl. No.: 13/143,043

(22) PCT Filed: Dec. 10, 2009

(86) PCT No.: PCT/GB2009/051679
§ 371 (c)(1),
(2), (4) Date: Jun. 30, 2011

(87) PCT Pub. No.: WO2010/076567
PCT Pub. Date: Jul. 8, 2010

(65) Prior Publication Data
US 2011/0268438 A1 Nov. 3, 2011

(30) Foreign Application Priority Data
Dec. 31, 2008 (GB) .................................. 0823688.7

(51) Int. Cl.
*H04J 14/00* (2006.01)
*H04B 10/071* (2013.01)
*G01M 11/00* (2006.01)

(52) U.S. Cl.
CPC ......... *H04B 10/071* (2013.01); *G01M 11/3136* (2013.01)

(58) Field of Classification Search
CPC .................................... H04J 14/0209
USPC .................................................. 398/85, 87, 34
See application file for complete search history.

(56) References Cited

U.S. PATENT DOCUMENTS

| 5,187,362 A | * | 2/1993 | Keeble | H04B 10/071 250/227.15 |
| 5,440,416 A | * | 8/1995 | Cohen | H04B 10/272 385/24 |

(Continued)

FOREIGN PATENT DOCUMENTS

| EP | 1104055 A2 | 5/2001 |
| EP | 1578038 A1 | 9/2005 |

(Continued)

OTHER PUBLICATIONS

International Preliminary Report on Patentability, issued by The International Bureau of WIPO, Geneva, Switzerland, dated Jul. 5, 2011, for related International Application No. PCT/GB2009/051679; 9 pages.

(Continued)

*Primary Examiner* — Danny Leung
(74) *Attorney, Agent, or Firm* — Merchant & Gould P.C.

(57) ABSTRACT

Devices and methods for optical measurements in point-to-point and point-to-multipoint networks, e.g. like PON networks with splitters are described in which reflected power from some known reflections at the end of the lines is used to determine the attenuation and stability of the attenuation of each line. Also a reference reflection is used at the beginning of the network so that an absolute loss measurement between the points of reflection and the reference reflection can be made. In a further aspect wavelength selective stable reflections and reflectors are used, to provide reflections in a wavelength range that does not interfere with normal operation.

13 Claims, 5 Drawing Sheets

(56) References Cited

U.S. PATENT DOCUMENTS

| | | | |
|---|---|---|---|
| 5,452,071 A | 9/1995 | Takeuchi | |
| 5,491,573 A * | 2/1996 | Shipley | G01M 11/3136 356/73.1 |
| 5,491,574 A * | 2/1996 | Shipley | G01M 11/3136 250/227.15 |
| 5,608,825 A | 3/1997 | Ip | |
| 5,673,108 A | 9/1997 | Takeuchi | |
| 5,825,520 A | 10/1998 | Huber | |
| 6,009,220 A * | 12/1999 | Chan | H04B 10/071 385/24 |
| 6,310,702 B1 * | 10/2001 | Minami | H04B 10/071 356/73 |
| 6,317,535 B1 * | 11/2001 | Jennings | G01M 11/3136 385/24 |
| 6,337,936 B1 | 1/2002 | Yoneyama | |
| 6,351,582 B1 * | 2/2002 | Dyke et al. | 385/24 |
| 6,512,610 B1 * | 1/2003 | Minami | G01M 11/3136 356/73.1 |
| 6,522,434 B1 * | 2/2003 | Jennings | H04B 10/07955 398/16 |
| 6,731,834 B2 * | 5/2004 | DeAngelis | H04Q 11/0005 385/16 |
| 6,816,683 B2 * | 11/2004 | Terahara | H04B 10/035 398/11 |
| 7,167,236 B2 * | 1/2007 | Suino | H04B 10/071 356/73.1 |
| 7,454,143 B1 | 11/2008 | Wu et al. | |
| 7,756,418 B2 * | 7/2010 | Ofalt | H04B 10/077 356/73.1 |
| 8,290,364 B2 * | 10/2012 | Yang | H04B 10/071 398/10 |
| 8,311,409 B2 * | 11/2012 | Chang | H04B 10/071 356/73.1 |
| 8,482,725 B2 * | 7/2013 | Perron | G01M 11/3118 356/73.1 |
| 8,750,702 B1 * | 6/2014 | Figueira | H04B 10/00 398/16 |
| 2002/0028039 A1 | 3/2002 | Lee et al. | |
| 2002/0196489 A1 * | 12/2002 | Terahara | H04B 10/035 398/5 |
| 2003/0026529 A1 | 2/2003 | Durkin et al. | |
| 2003/0210850 A1 * | 11/2003 | DeAngelis | H04Q 11/0005 385/17 |
| 2005/0105902 A1 | 5/2005 | Alavie et al. | |
| 2006/0029390 A1 * | 2/2006 | Schmuck | H04B 10/071 398/33 |
| 2006/0198634 A1 * | 9/2006 | Ofalt | H04B 10/077 398/16 |
| 2007/0166040 A1 | 7/2007 | Jang et al. | |
| 2007/0223920 A1 * | 9/2007 | Moore | H04B 10/077 398/38 |
| 2009/0047013 A1 * | 2/2009 | Effenberger | H04B 10/071 398/16 |
| 2009/0154870 A1 * | 6/2009 | Watanabe | G01D 5/35303 385/12 |
| 2009/0269054 A1 * | 10/2009 | Smith | H04B 10/0773 398/25 |
| 2011/0001877 A1 * | 1/2011 | Pugel | H03H 7/463 348/565 |
| 2011/0110662 A1 * | 5/2011 | Wellbrock | H04Q 11/0067 398/45 |
| 2011/0268438 A1 * | 11/2011 | Daems | H04B 10/071 398/16 |
| 2012/0045205 A1 * | 2/2012 | Perron | H04B 10/0795 398/48 |

FOREIGN PATENT DOCUMENTS

| | | |
|---|---|---|
| GB | 2261506 A | 5/1993 |
| WO | WO 90/06498 | 6/1990 |
| WO | WO 98/49795 | 11/1998 |

OTHER PUBLICATIONS

Yuksel K. et al., "Optical Layer Monitoring in Passive Optical Networks (PONs): A Review: Transparent Optical Networks," IEEE 2008; pp. 92-98.

Ab-Rahman, M. et al., "The Overview of Fiber Fault Localization Technology in TDM-PON Network," 2008 International Conference on Electronic Design, Dec. 1-3, 2008; Penang, Malaysia; pp. 1-8.

International Search Report and Written Opinion issued by the European Patent Office, dated Apr. 22, 2010, for PCT/GB2009/051679; 16 pages.

Search Report issued by the German Patent & Trademark Office, dated Mar. 13, 2009, for Priority Application No. GB0823688.7; 2 pages.

* cited by examiner

FIG. 4 ial, the present invention relates to devices and methods for optical measurements in passive point-to-point and point-to-multipoint networks (like PON networks with splitters).

UNIDIRECTIONAL ABSOLUTE OPTICAL ATTENUATION MEASUREMENT WITH OTDR

The present invention relates to optical networks, especially branched optical fiber networks in a telecommunications system, to methods of operating such networks and devices and software for use with such networks. In particular, the present invention relates to devices and methods for optical measurements in passive point-to-point and point-to-multipoint networks (like PON networks with splitters).

TECHNICAL BACKGROUND

Figure 1:
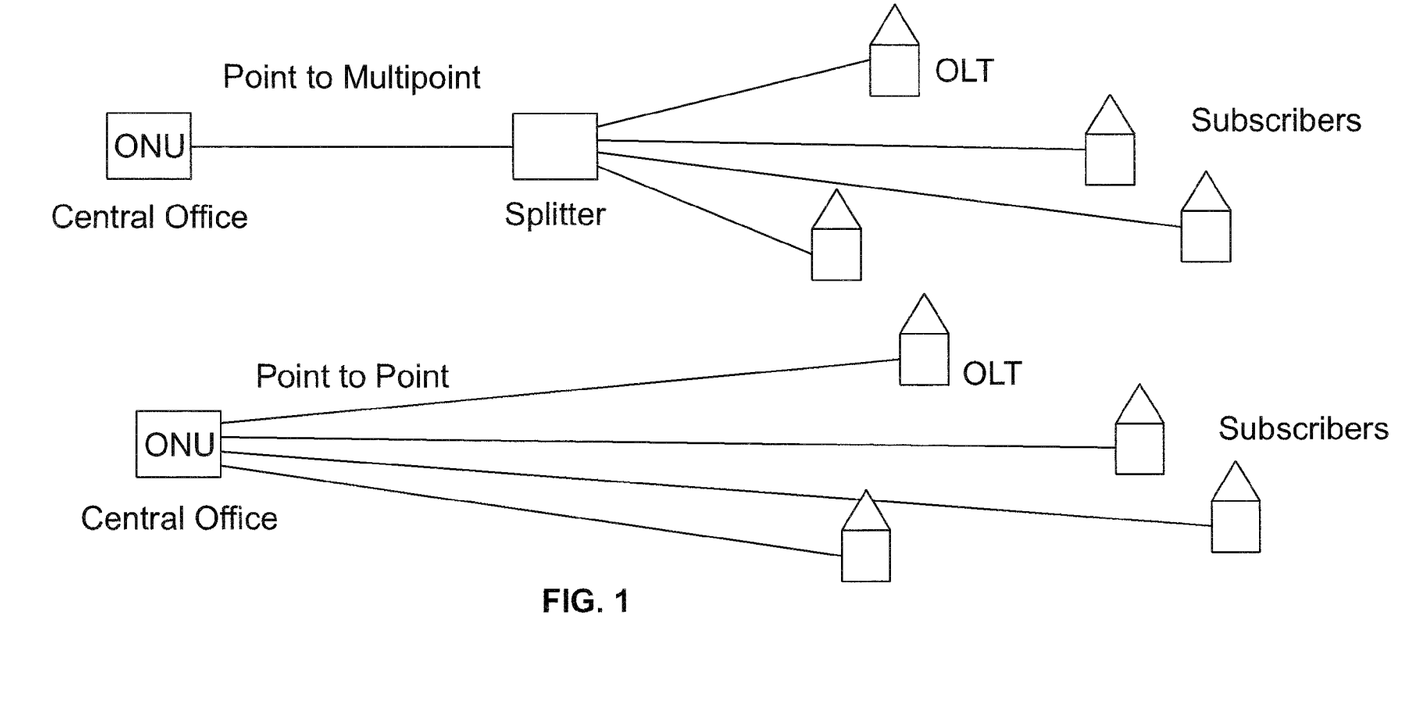
FIG. 1 shows networks that can be used with the present invention.

FIG. 1 shows schematically networks between a central office and subscribers such as a point-to point optical telecommunications network and a point to multipoint optical telecommunications network having a splitter and branch fibers. A passive optical network (PON) is a point-to-multipoint network architecture in which unpowered optical splitters are used to enable a single optical fiber to serve multiple premises, typically 32-128. A PON consists of an Optical Line Terminal (OLT and a number of Optical Network Units (ONUs).

Network operators have a need for test equipment (like OTDR equipment) that is capable of monitoring connected and unconnected lines from a central office during installation and during maintenance. Preferably access to the far ends of the network for such monitoring should not be required, e.g. without truck rolls. This requirement effectively excludes any method which requires an optical source at one end of the fiber and a detector to be placed at the other. Also, preferably, the measurements should not disturb the data traffic. For this reason, there is a requirement that additional equipment, e.g. standard or calibrated reflectors or detectors, are not attached and detached from the optical fiber, either at the head end or remote ends of the fiber network.

One problem is that the interpretation of the OTDR measurements is quite complicated or sometimes even impossible on point to multipoint networks for the following reasons. The measured loss in a fiber network depends on the number of splitter ports, the number of drop cables spliced to the splitter and even the location where the loss occurs in the drop cable. This makes it extremely complicated to monitor the change in attenuation of each line, certainly when the network changes over time. For example, the same bend in the fiber at different locations will give different measured loss values when measured with an OTDR. Also as the number of branch fibers increases, the signal from each fiber gets weaker. Conventional systems use the backscattered optical power information of the fibers, i.e. the noisy baseline of OTDR trace. Beyond the splitter the signal becomes noisy due to the lack of dynamic range. No accurate information can be obtained from this noisy baseline. For splitter levels above 1×8 often no information at all can be obtained from the baseline. For example, with a 1 to 32 splitter, a 3 dB loss in a 1×32 PON network can give measured values ranging from 0.02 dB to 3 dB depending the location of the loss and the length of the other drop lines. This can means that it is not possible to set alarms reliably.

Conventional OTDR has the following problems:
Substitution of traces from all ports
For 1:32 splitter ratio's the received power from a single port is close to the noise level of the test equipment. For example, OTDR has only 20-25 dB dynamic range without averaging and short pulses.
Measured splice loss for a splice located after the splitter depends on splitter port count and location in the drop cable.

SUMMARY OF THE INVENTION

An object of the present invention is to provide devices and methods for optical measurements in point-to-point and point-to-multipoint networks, e.g. like PON networks with splitters.

An aspect of the present invention is that reflected power from some known reflections at the end of the lines is used to determine the attenuation and stability of the attenuation of each line after the splitter. Also a reference reflection is used at the beginning of the network so that an absolute loss measurement between the points of reflection and the reference reflection can be made.

In a further aspect wavelength selective stable reflections and reflectors are used, to provide reflections in a wavelength range that does not interfere with normal operation.

Optical measurement methods and devices according to embodiments of the present invention are suitable for both point to point and point to multipoint networks. These are based on returning signals, e.g. from reflective points in the network and are based on amplitude measurents of returning signals, e.g. reflections, from know devices.

Allows unidirectional measurements in point to multipoint networks

Optical measurement methods and devices according to embodiments of the present invention allow measurements of absolute attenuation of each line and the change in attenuation for each line (=stability of network).

Optical measurement methods and devices according to embodiments of the present invention do not interfere with the data transmission when wavelength selective devices are used, e.g. reflectors.

Optical measurement methods and devices according to embodiments of the present invention are not influenced by changes in other branches after the.

Optical measurement methods and devices according to embodiments of the present invention can be used in centralized or distributed splitter PON.

Optical measurement methods and devices according to embodiments of the present invention can be used in G-PON networks with split levels up to 64 or higher.

Various embodiments of the present invention are defined in the attached claims. In particular the present invention provides a monitoring device for monitoring absolute loss between two points in an optical network, said network comprising an optical transmission path having a head end and at least one remote end, an optical signal returning device being placed at a first location in the network and a reference optical signal returning device being placed at a second location in the network, wherein the monitoring device comprises: equipment for communication with the head end for sending a test signal and for receiving a first returning signal from the optical signal returning device and a second returning reference signal from the reference optical signal returning device, both the first returning signal and the second returning reference signal being derived from the test signal, the equipment having means for comparing the first returning signal and the second returning reference signal and for deriving therefrom a value related to the absolute loss between the first and second locations in the network.

Preferably, at least one of the optical signal returning device and the reference optical signal returning device is a wavelength selective device.

The present invention also provides a unidirectional method of monitoring absolute loss between two points in an optical network, said network comprising an optical transmission path having a head end and at least one remote end, an optical signal returning device at a first location in the network and a reference optical signal returning device at a second location in the network,
wherein the method comprises:
sending a test signal from the head end,
receiving a first returning signal from the optical signal returning device and a second returning reference signal from the reference optical signal returning device, both the first returning signal and the second returning reference signal being derived from the test signal, comparing the first returning signal and the second returning reference signal and deriving therefrom a value related to the absolute loss between the first and second locations in the network.

Preferably, at least one of the first returning signal and the second reference returning signal is a first wavelength selective signal.

Also the present invention provides an optical device comprising:
a first port for connection to a first optical fiber,
a second port for connection to a second optical fiber,
a third port connected to an optical signal returning device,
wherein when an optical signal is fed to the first port, the optical device returns a signal back through the first port that is wavelength selective.

In another aspect the present invention provides a computer program product that when executed on a processing engine, can provide a method of monitoring absolute loss between two points in an optical network, wherein the network comprises an optical transmission path having a head end and at least one remote end, an optical signal returning device at a first location in the network and a reference optical signal returning device at a second location in the network, the computer program product providing for:
sending a test signal from the head end,
receiving a first returning signal from the optical signal returning device and a second returning reference signal from the reference optical signal returning device, both the first returning signal and the second returning reference signal being derived from the test signal, comparing the first returning signal and the second returning reference signal and deriving therefrom a value related to the absolute loss between the first and second locations in the network, wherein at least one of the first returning signal and the second reference returning signal is a first wavelength selective signal.

A machine readable signal storage device can store the computer program product, e.g. a CD-ROM or similar.

DESCRIPTION OF THE ILLUSTRATIVE EMBODIMENTS

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes. Where the term "comprising" is used in the present description and claims, it does not exclude other elements or steps. Where an indefinite or definite article is used when referring to a singular noun e.g. "a" or "an", "the", this includes a plural of that noun unless something else is specifically stated.

The term "comprising", used in the claims, should not be interpreted as being restricted to the means listed thereafter; it does not exclude other elements or steps. Thus, the scope of the expression "a device comprising means A and B" should not be limited to devices consisting only of components A and B. It means that with respect to the present invention, the only relevant components of the device are A and B.

Furthermore, the terms first, second, third and the like in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

Moreover, the terms top, bottom, over, under and the like in the description and the claims are used for descriptive purposes and not necessarily for describing relative positions. It is to be understood that the terms so used are interchangeable under appropriate circumstances and that the embodiments of the invention described herein are capable of operation in other orientations than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

In the description provided herein, numerous specific details are set forth. However, it is understood that embodiments of the invention may be practiced without these specific details. In other instances, well-known methods, structures and techniques have not been shown in detail in order not to obscure an understanding of this description.

The present invention will now be described by a detailed description of several embodiments of the invention. It is clear that other embodiments of the invention can be configured according to the knowledge of persons skilled in the art without departing from the technical teaching of the invention, the invention being limited only by the terms of the appended claims.

The present invention relates to test equipment (like OTDR equipment) that is capable of monitoring connected and unconnected lines from a central office during installation and during maintenance. Access to the far ends of the network for such monitoring is not required, e.g. no need for truck rolls. Also, in embodiments of the present invention, the measurements need not disturb the data traffic, e.g. by using a separate test wavelength and by use of wavelength selective devices in the test network. Optical devices and equipment, including wavelength selective devices, are known and are described for example in "Fiber-Optic Communications Technology", Mynbaev and Scheiner, Prentice Hall, 2001 which is a useful reference.

Figure 2:
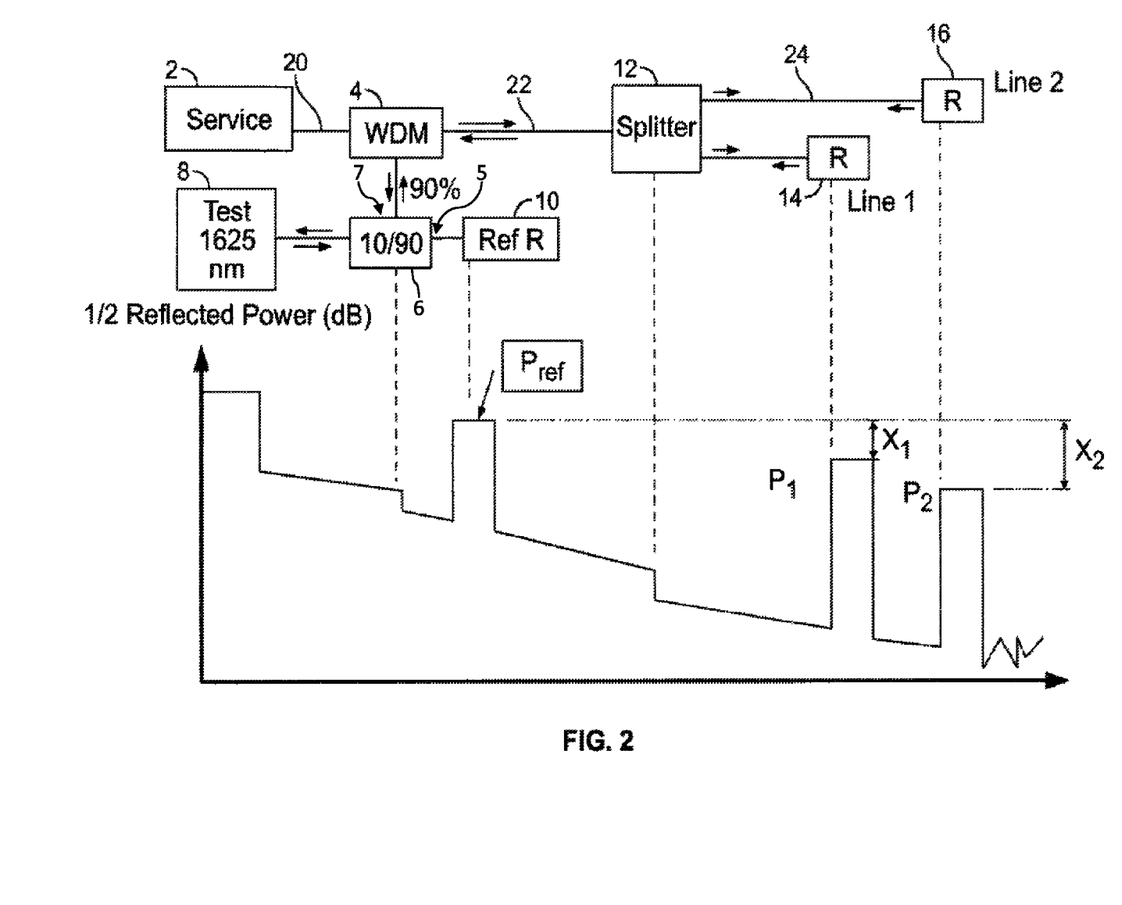
FIG. 2 shows a network in accordance with an embodiment of the present invention

FIG. 2 is a schematic representation of an embodiment of the present invention, e.g. a PON. Optical service equipment 2 is or can be connected to a fiber 20, 22 for provision of a service such a telecommunications, monitoring, alarm service, etc. A splitter 12 can be provided if there are branch fibers 24, 26. Each or the fiber such as 24, 26 is terminated respectively by an optical signal returning device 14, 16. The signal returning device can be a reflector or similar. Preferably, the signal returning device 14, 16 is a passive device but it can also be a switchable, preferably remotely switchable device, or an active device. The signal returning device 14, 16 is shown in FIG. 2 as a terminal device, however the present invention is not limited thereto. Such signal returning devices can be placed at intermediate positions in the fiber network as will be explained later. The device 14, 16 may be permanently attached to the fiber or be part of the fiber with which it is associated. In a particularly preferred embodiment the optical signal returning device 14, 16 returns an optical signal to the head end that is wavelength selective. In particular it is preferred if the optical signal returning device 14, 16 returns a signal to the head end that is not of the same wavelength as is used by the service equipment 2. By this means, data traffic on the network provided by service equipment 2 is not disturbed. In an alternative, the optical signal returning device 14, 16 may be a wavelength converter such that the wavelength used by the service equipment 2 is converted to another wavelength so that the returning signal is derived from the incident traffic signals but is not of the same wavelength as is used by the service equipment 2. Such a conversion can be done by a fluorescing material for example but could also be performed by an active device.

In accordance with an aspect of the present invention, backscattered optical power information of the fibers (=the noisy baseline of OTDR trace) is not used, or is not necessarily used for monitoring purposes. Instead (or in addition to the backscattered light), the reflected power of returning signals from the optical signal returning devices 14, 16, e.g. from some known reflections at positions in the network, e.g. the ends of the lines, is used to determine attenuation (e.g. absolute power loss) and stability of the attenuation (i.e. change of power loss) of each line after the splitter 12. In addition a reference reflection is used at one end of the network, e.g. at the head end of the network so that an absolute loss measurement can be made between two points in the fiber network, e.g. between a fiber position of reflection and the fiber position of the reference reflection.

If wavelength conversion is not used in the optical signal returning devices 14, 16, a separate optical test equipment 8 is provided, such as an OTDR, that operates at a different wavelength (for example the test equipment 8 operates at a wavelength of 1625 nm) than the service equipment 2 (e.g. that operates at 1490, 1550 nm when the network is operational). In embodiments of the present invention, the test equipment 8 sends out optical pulses. The pulses may have constant amplitude (e.g. similar to an OTDR). The pulses may be modulated in any known manner in order to make them more easily distinguishable. The pulsed light at 1625 nm from the test equipment is split into two path, e.g. by an asymmetrical splitter such as a 10/90 or a 1/99 splitter 6 including ports 5 and 7. The lower intensity port 5, e.g. the 10% port is connected with an optical signal returning device 10, serving as a reference reflection. All light from this reflected reference goes back through the asymmetrical splitter, e.g. the 10/90 splitter to the test equipment 8 and the reflected power ($P_{ref}$) is used in a measurement method according to embodiments of the present invention.

Figure 3A:
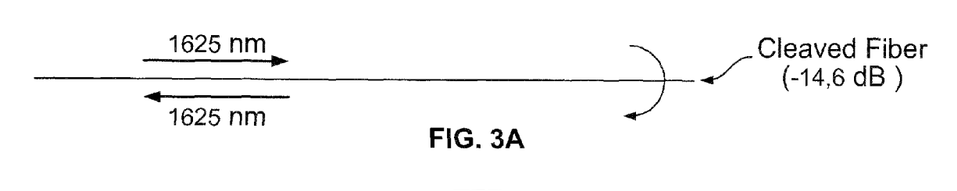
FIGS. 3a to d show exemplary reflecting devices in accordance embodiments of the present invention.
Figure 3B:
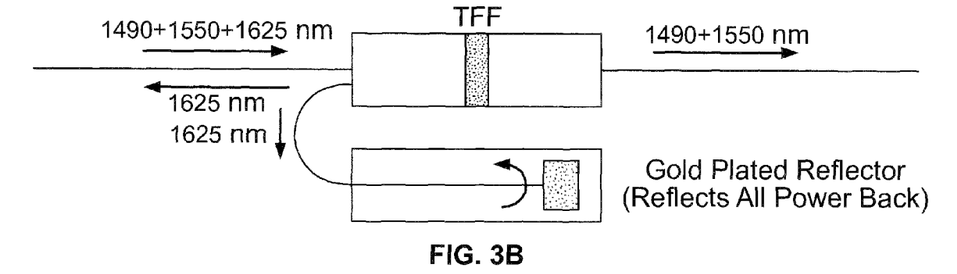
Figure 3C:
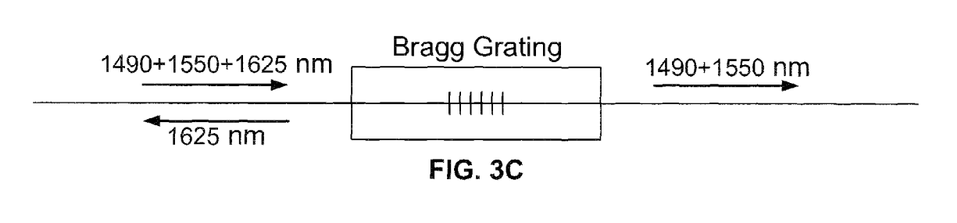
Figure 3D:
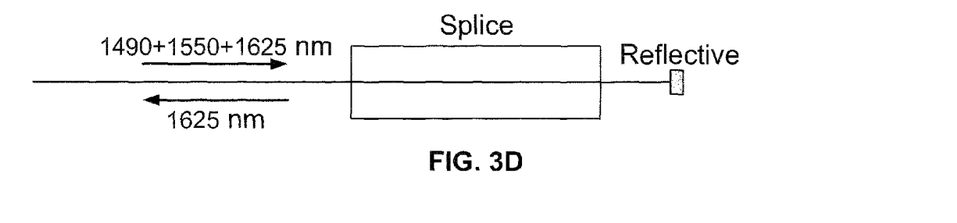

The optical signal returning device 10 can be any of the devices described for the optical signal returning devices 14, 16. Some examples of optical signal returning devices 10, 14, 16 are shown by way of example only in FIG. 3. These include a cleaved fiber end (FIG. 3a) which can be used as a terminal optical signal returning device 14, 16. The fiber end can be a straight cleaved or gold plated fiber end, for example. In both cases the impinging light is returned. Another option is a splitter or coupler connected via one port to a reflector (FIG. 3b). The splitter or coupler can be wavelength selective such that the network and test wavelengths can be divided. For example light impinging on the device may have at least two wavelengths, e.g. 1490+1550+1625 nm and the light returned has only the test wavelength 1625 nm. An example of a wavelength selective splitter or coupler can be a thin film filter wide-WDM coupler in which the test signal wavelength port is connected to a reflector such as a gold reflector (FIG. 3b). In such a device the splitter or coupler is wavelength selective and the reflector reflects all optical power. However a similar device can be constructed by using a plain splitter or coupler and a wavelength selective reflector. A further option is a Bragg grating as shown in FIG. 3c. Yet another option is to use a reflector, e.g. via a splice as shown in FIG. 3d. Yet a further optical signal returning device can be the switchable OMU described in EP 1578039 and shown in FIG. 2 thereof. EP 1578039 is incorporated herein in its entirety by reference. To activate switchable optical signal returning devices such as shown in EP 1578039, the pulses from the test equipment 6 may be modulated with suitable commands. Yet a further optical signal returning device can be a luminescence converter as described in U.S. Pat. No. 5,991,479, incorporated herein in its entirety by reference. The present invention also includes combinations of the devices described above.

The devices described above with respect to FIG. 3 can be placed as terminating devices of a fiber of they can be placed at intermediate positions in the network. In the latter case the absolute loss measurements are then made between the intermediate position and the position of the reference optical signal returning device 10.

Some of the devices described above may be summarized (e.g. as shown in FIG. 3 b) as optical devices comprising:
a first port for connection to a first optical fiber, a second port for connection to a second optical fiber, a third port connected to an optical signal returning device, wherein when an optical signal is fed to the first port, the optical device returns a signal back through the first port that is wavelength selective. Such devices are suitable for placing at intermediate positions in the network.

Returning now to FIG. 2, the remaining light from the other port of asymmetrical splitter 6, e.g. the 90% port is added to the network via a coupler such as a WDM 4. The test signal (1625 nm) travels together with the data signals (e.g. at 1490, 1550 nm when the network is operational) to the subscriber locations. Where branch fibers are provided, the test signal travels together with the data signals through the splitter 12 that can be a 1:32 splitter for example, to the subscriber locations. All the branches of the 1:32 splitter are terminated with an optical signal returning devices 14, 16, e.g. a reflective termination.

The returning (e.g. reflected) signals having powers $P_1$, $P_2$, ... $P_N$ from each branch fiber 24, 26 travel back to the test equipment 8 via the splitter 12, the WDM 4 and the splitter 6. The length of each fiber 24, 26 after the splitter 12 is chosen (or is adjusted) in such a way that the reflected light pulses arrive at the test equipment 8 at different times. This can usually be arranged simply as typically a 10 ns delay corresponds with a 2 meter length.

Comparing the reflected powers $P_N$ from each branch with $P_{ref}$ in the test equipment 8 gives the insertion loss of each branch (i.e. a value representative of the absolute loss):

$$\text{Loss}(\text{branch } N) = P_{ref}(\text{dB}) - P_N(\text{dB}) + C$$

where C is a constant depending, for example on the split ratio tolerance of the splitter 6, e.g. the 10/90 splitter split ratio tolerance as well as the reflective coefficient of the further optical signal returning devices 14, 6, e.g. reflectors at the end of the line. $P_{ref}(\text{dB}) - P_1(\text{dB})$ and $P_{ref}(\text{dB}) - P_2(\text{dB})$ are shown as $X_1$ and $X_2$ in FIG. 2.

The value of constant C is given by (for example—depending on the circuit components):

$$C = \tfrac{1}{2}[R_0 - R_N] + \text{Loss}_{10\% \, port} - \text{Loss}_{90\% \, port} - \text{Loss}_{WDM}$$

Figure 4:
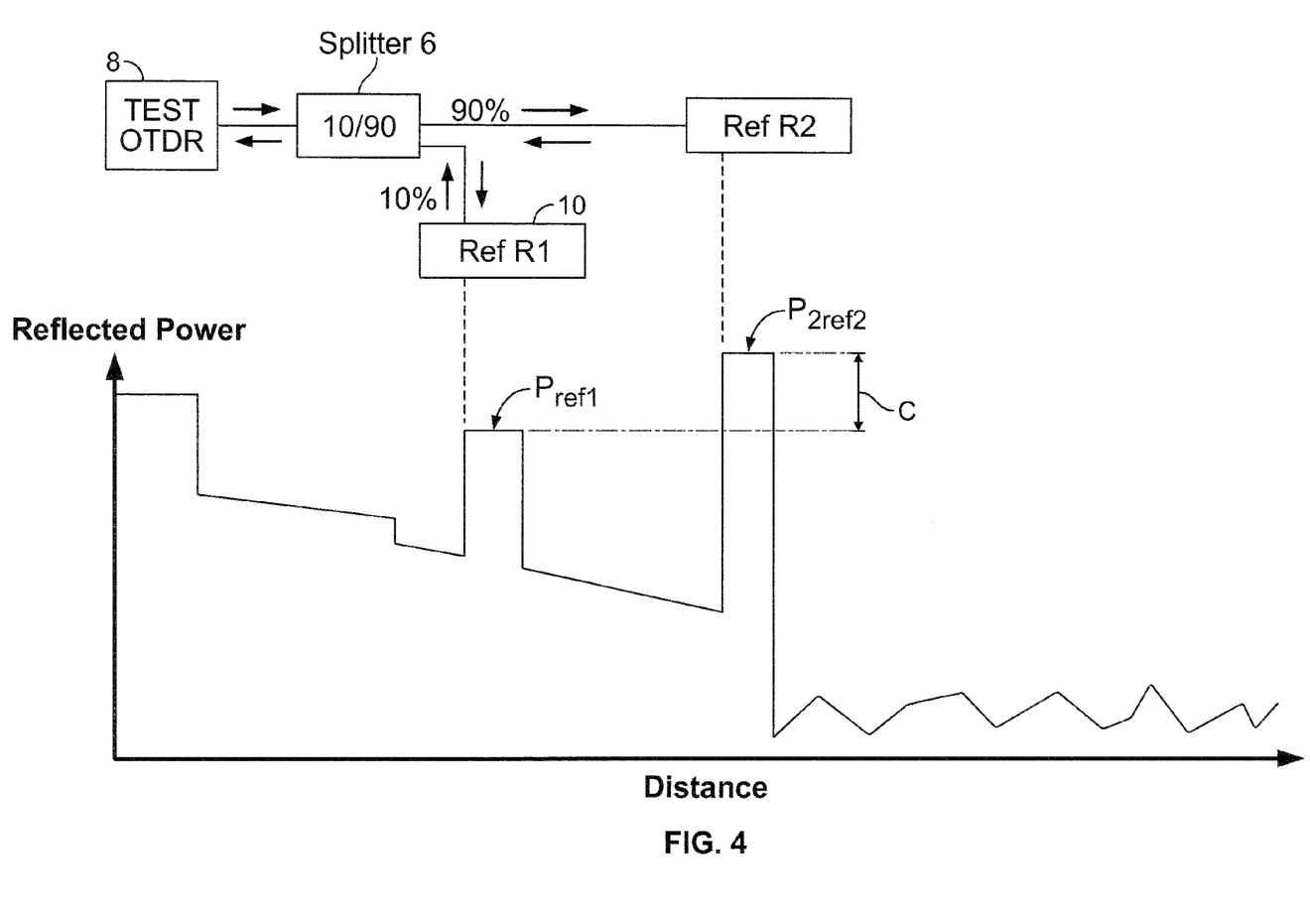
FIG. 4 shows how test equipment in accordance with the present invention can be calibrated.

Where:
$R_0$ = Return loss of the reference optical signal returning device 10, e.g. a reference reflector with return loss of 14.6 dB when this is a cleaved fiber
$R_N$ = Return loss of termination optical signal returning device 14, 16 of branch N with return loss of 14.6 dB when this is a cleaved fiber
Loss 10% port = loss of the 10% branch of the 10/90 measurement splitter 6 e.g. 10.1 dB
Loss 90% port = loss of the 90% branch of the 10/90 measurement splitter 6 e.g. 0.5 dB
Loss WDM = loss of the test wavelength port of the WDM 4, e.g. 0.3 dB From these values C is about 9.3 dB based on theoretical values for splitter 6 and WDM 4. When a 1%/99% measurement splitter 6 is used the value of C will become about 19.7 dB. Preferably, the correct and accurate value for C is obtained by calibration of the optical test equipment on the relevant network. This can be done as shown schematically in FIG. 4 by using a reference reflector RefR2 terminating a fiber length in comparison with the reflector 10 as described above (RefR1), the splitter 6 and test equipment 8. If necessary, the results obtained can be compared with a power meter or any other method of obtaining a value of the absolute loss. This calibration can be done when setting up the optical network. Once calibrated, the measurement of absolute loss can be done without further use of power meters. The network and the test equipment can be adapted by known methods to allow remote sensing, e.g. via a data connection such as a wide area data network (e.g. the Internet) or via another telecommunications network, e.g. via email or SMS messaging.

It can be understood from the above that the measured attenuation is derived from the amplitude of the returned, e.g. reflective pulses, not from the backscattered power of the fibers themselves (=baseline) although this can be used in addition. The typical reflected power when using a +10 dBm pulse will be between −30 dBm and −40 dBm for a network with a 1×32 splitter, which is about 40 to 60 dB higher than the power information of the backscattered power of the baseline. Either a dedicated test equipment can be used generating optical pulses different from the operating pulses or the operating optical pulses can be, e.g. by using wavelength converting optical signal returning devices.

Since the power from the reflection peaks is many decades higher than the Raleigh scattering of the fibers (=baseline) the influence on the measured loss when adding or removing lines at the output of the splitter will be neglectable.

The network operator or the installer of the network does not need to carry a power meter, but can get measurements remotely, e.g. via mobile phone using SMS.

Methods and devices according to the present invention do not require a truck roll towards the splitter location or subscriber location to measure the correct link loss.

Accurate loss measurements are possible from just one side of the network through the splitter.

The measured loss is not depending on the number of splitter ports in use or location where the loss is created.

It can be understood from the above that the measured absolute values of loss are obtained by methods and devices according to the present invention. As an extension of the present invention, the network can be monitored over time and changes in loss can be detected, e.g. as caused by a sharp bend introduced into a fiber. The measurement of absolute loss allows a change over time to be detected, whereas relative methods may suffer from changes in conditions between measurements which alter the result.

The test equipment 8 can comprise hardware circuits, or some parts can be implemented in software in any computer language, run by conventional processing hardware such as a general purpose microprocessor, or application specific integrated circuits for example.

Hence the test equipment 6 according to embodiments of the present invention may be implemented as hardware, computer software, or combinations of both. The test equipment 6 may include a general purpose processor, an embedded processor, an application specific integrated circuit (ASIC), a field programmable gate array (FPGA) or other programmable logic device, discrete gate or transistor logic, discrete hardware components, or any combination designed to perform the functions described herein. A processor may also be implemented as a combination of computing devices, e.g., a combination of an FPGA and a microprocessor, a plurality of microprocessors, one or more microprocessors in conjunction with an FPGA, or any other such configuration.

Figure 5:
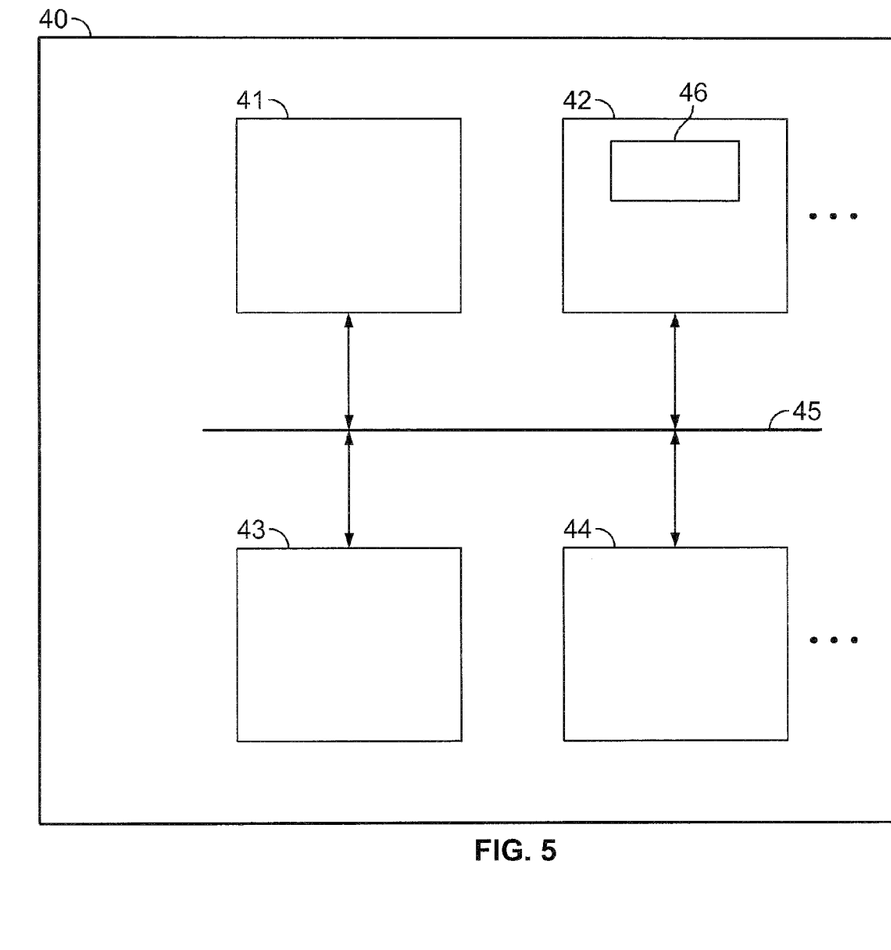
FIG. 5 a computer system that can be used with test equipment in accordance with embodiments of the present invention.

The processing system may include a computing device or processing engine, e.g. a microprocessor. Any of the test methods described above according to embodiments of the present invention or claimed may be implemented in a processing system 40 such as shown in FIG. 5. FIG. 5 shows one configuration of processing system 40 that includes at least one customisable or programmable processor 41 coupled to a memory subsystem 42 that includes at least one form of memory, e.g., RAM, ROM, and so forth. It is to be noted that the processor 41 or processors may be a general purpose, or a special purpose processor, and may be for inclusion in a device, e.g. a chip that has other components that perform other functions. Thus, one or more aspects of the method according to embodiments of the present invention can be implemented in digital electronic circuitry, or in computer hardware, firmware, software, or in combinations of them. The processing system may include a storage subsystem 43 that has at least one disk drive and/or CD-ROM drive and/or DVD drive. In some implementations, a display system, a keyboard, and a pointing device may be included as part of a user interface subsystem 44 to provide for a user to manually input information, such as parameter values. Ports for inputting and outputting data may be included, e.g. opto-electronic ports. More elements such as network connections including wireless and/or opto-electronic connections, interfaces to various devices including wireless and/or opto-electronic interfaces, and so forth, may be included, but are not illustrated in FIG. 9. These may be used for remote operation of the test equipment. The various elements of the processing system 40 may be coupled in various ways, including via a bus subsystem 45 shown in FIG. 5 for simplicity as a single bus, but which will be understood to those in the art to include a system of at least one bus. The memory of the memory subsystem 42 may at some time hold part or all (in either case shown as 46) of a set of instructions that when executed on the processing system 40 implement the steps of the method embodiments described herein. The processing system described above is adapted to receive the optical signal from the devices 10, 14 and/or 16 and to perform calculations and to out put a value representative of the absolute loss.

The present invention also includes a computer program product which provides the functionality of any of the methods according to the present invention when executed on a computing device. Software according to the present invention, when executed on a processing engine, can contain code segments that provide a method of monitoring absolute loss between two points in an optical network, wherein the network comprises an optical transmission path having a head end and at least one remote end, an optical signal returning device at a first location in the network and a reference optical signal returning device at a second location in the network.

Software according to the present invention, when executed on a processing engine, can contain code segments that provide for sending a test signal from the head end, receiving a first returning signal from the optical signal returning device and a second returning reference signal from the reference optical signal returning device, both the first returning signal and the second returning reference signal being derived from the test signal, comparing the first returning signal and the second returning reference signal and deriving therefrom a value related to the absolute loss between the first and second locations in the network, wherein at least one of the first returning signal and the second reference returning signal is a first wavelength selective signal.

Such a computer program product can be tangibly embodied in a carrier medium carrying machine-readable code for execution by a programmable processor. The present invention thus relates to a carrier medium carrying a computer program product that, when executed on computing means, provides instructions for executing any of the methods as described above. The term "carrier medium" refers to any medium that participates in providing instructions to a processor for execution. Such a medium may take many forms, including but not limited to, non-volatile media, and transmission media. Non-volatile media includes, for example, optical or magnetic disks, such as a storage device which is part of mass storage. Common forms of computer readable media include, a CD-ROM, a DVD, a flexible disk or floppy disk, a tape, a memory chip or cartridge or any other medium from which a computer can read. Various forms of computer readable media may be involved in carrying one or more sequences of one or more instructions to a processor for execution. The computer program product can also be transmitted via a carrier wave in a network, such as a LAN, a WAN or the Internet. Transmission media can take the form of acoustic or light waves, such as those generated during radio wave and infrared data communications. Transmission media include coaxial cables, copper wire and fibre optics, including the wires that comprise a bus within a computer.

Other variations can be envisaged within the scope of the claims.

The invention claimed is:

1. A monitoring device for monitoring absolute loss between two points in an optical network, said optical network comprising an optical transmission path having a head end and at least one remote end, the optical network carrying data traffic using at least light of a first wavelength, wherein the monitoring device comprises:
    an optical signal returning device at a first location in the optical network;
    a reference optical signal returning device at a second location in the optical network;
    optical test equipment for communicating with the head end, the optical test equipment optically connected to the optical network at a location spaced apart from at least the first location and configured to:
        send a test signal at a test wavelength, different from the first wavelength; and
        receive a first returning signal from the optical signal returning device and a second returning reference signal from the reference optical signal returning device, both the first returning signal and the second returning reference signal being derived from the test signal; and
        compare the first returning signal and the second returning reference signal to derive therefrom a value related to the absolute loss between the first and second locations in the optical network, wherein at least one of the optical signal returning device and the reference optical signal returning device is a wavelength selective device, wherein the test signal travels with the data signal remains spaced apart from the reference optical signal returning device.

2. The monitoring device according to claim 1, wherein the optical signal returning device and/or the reference optical signal returning device returns a signal that has a different wavelength than the first wavelength.

3. The monitoring device according to claim 1, wherein the test signal is an OTDR signal.

4. Monitoring device for monitoring absolute loss between two points in an optical network, said network comprising an optical transmission path having a head end and at least one remote end, an optical signal returning device at a first location in the network and a reference optical signal returning device at a second location in the network, wherein the monitoring device comprises:

equipment for communicating with the head end for sending a test signal and for receiving a first returning signal from the optical signal returning device and a second returning reference signal from the reference optical signal returning device, both the first returning signal and the second returning reference signal being derived from the test signal, the equipment having means for comparing the first returning signal and the second returning reference signal and for deriving therefrom a value related to the absolute loss between the first and second locations in the network, wherein at least one of the optical signal returning device and the reference optical signal returning device is a wavelength selective device, wherein the equipment is coupled to the reference optical signal returning device via an asymmetrical splitter, the asymmetrical splitter splitting the test signal into a first portion sent to the optical signal returning device and a second portion sent to the reference optical signal returning device, first portion being unequal to the second portion, wherein the first portion of the test signal exits the asymmetrical splitter along a first axis and the second portion of the test signal exits the asymmetrical splitter along a second axis, the first returning signal from the optical signal returning device entering the asymmetrical splitter along the first axis and the second returning reference signal from the reference optical signal returning device entering the asymmetrical splitter along the second axis.

5. The monitoring device according to claim 1, wherein the equipment is coupled to the optical network via a WDM.

6. The monitoring device according to claim 1, wherein the optical network comprises a splitter and branch fibers connected to the splitter.

7. The monitoring device according to claim 1 wherein at least one of the optical signal returning device and the reference optical signal returning device is a passive device.

8. An optical fiber network comprising the monitoring device according to claim 1.

9. Unidirectional method of monitoring absolute loss between two points in an optical network, said optical network comprising an optical transmission path having a head end and at least one remote end, an optical signal returning device at a first location in the optical network and a reference optical signal returning device at a second location in the optical network, the optical network carries data traffic using at least light of a first wavelength, wherein the method comprises:

sending a test signal from the head end at a test wavelength different from the first wavelength while the optical network is carrying the data traffic using at least light of the first wavelength, receiving a first returning signal from the optical signal returning device and a second returning reference signal from the reference optical signal returning device, both the first returning signal and the second returning reference signal being derived from the test signal, and the data signal remains spaced apart from the reference optical signal returning device, comparing the first returning signal and the second returning reference signal and deriving therefrom a value related to the absolute loss between the first and second locations in the optical network, wherein at least one of the first returning signal and the second reference returning signal is a wavelength selective signal.

10. The method according to claim 9, further comprising coupling the equipment to the reference optical signal returning device via an asymmetrical splitter, the asymmetrical splitter splitting the test signal into a first portion sent to the optical signal returning device and a second portion sent to the reference optical signal returning device, first portion being unequal to the second portion.

11. The method according to claim 9, wherein the test signal is an OTDR signal.

12. A machine readable signal storage device tangibly storing a computer program product that when executed on a processing engine, can provide a method of monitoring absolute loss between two points in an optical network, wherein the optical network comprises an optical transmission path having a head end and at least one remote end, an optical signal returning device at a first location in the optical network and a reference optical signal returning device at a second location in the optical network, the optical network carries data traffic using at least light of a first wavelength, the computer program product providing for:

sending a test signal from the head end at a test wavelength different from the first wavelength while the optical network is carrying the data traffic using at least light of the first wavelength, receiving a first returning signal from the optical signal returning device and a second returning reference signal from the reference optical signal returning device, both the first returning signal and the second returning reference signal being derived from the test signal, the data signal remains spaced apart from the reference optical signal returning device, comparing the first returning signal and the second returning reference signal and deriving therefrom a value related to the absolute loss between the first and second locations in the optical network, wherein at least one of the first returning signal and the second reference returning signal is a first wavelength selective signal.

13. The monitoring device of claim 1, wherein the optical test equipment includes an optical time domain reflectometer optically connected to a splitter, the splitter delivering the test signal to the reference optical signal returning device and separately to an optical device along the optical transmission path.

* * * * *